United States Patent [19]
van Leuwen et al.

[11] 3,935,133

[45] Jan. 27, 1976

[54] HIGH RESILIENCE POLYURETHANE FOAM STABILIZED WITH A SILICATE-BASED SURFACTANT COMPOSITION

[75] Inventors: Bruce G. van Leuwen, Trumbull; Ralph A. Colafati, III, New Haven, both of Conn.

[73] Assignee: Olin Corporation, New Haven, Conn.

[22] Filed: Dec. 23, 1974

[21] Appl. No.: 535,549

Related U.S. Application Data

[63] Continuation-in-part of Ser. No. 428,489, Dec. 26, 1973, abandoned.

[52] U.S. Cl................ 260/2.5 AH; 260/2.5 AP

[51] Int. Cl.²............... C08G 18/14; C08K 5/54
[58] Field of Search................ 260/2.5 AH, 2.5 AP

[56] References Cited
UNITED STATES PATENTS

| | | | |
|---|---|---|---|
| 3,795,636 | 3/1974 | Huffman | 260/2.5 AP |
| 3,821,130 | 6/1974 | Barron | 260/2.5 AP |

*Primary Examiner*—C. Warren Ivy
*Attorney, Agent, or Firm*—Kenneth P. Glynn; F. A. Iskander

[57] ABSTRACT

High resilience polyether polyurethane foam is prepared from a reaction mixture comprising a silicate-based surfactant composition.

16 Claims, No Drawings

HIGH RESILIENCE POLYURETHANE FOAM STABILIZED WITH A SILICATE-BASED SURFACTANT COMPOSITION

This application is a continuation-in-part of copending U.S. application Ser. No. 428,489, filed Dec. 26, 1973, now abandoned.

This invention relates to an improvement in the polyurethane foam art. More particularly, the invention relates to the use of a select silicate-based surfactant composition in the preparation of high resilience polyurethane foam.

It is known to prepare a polyurethane foam by reacting a polyether polyol, or a mixture of such polyols, with an organic polyisocyanate. The reaction is carried out in the presence of a foaming agent, a reaction catalyst and a silicon-based surfactant which serves the function of stabilizing and improving the cellular structure of the resulting foam.

It is also known, the art of making flexible polyurethane foam, that the use of highly reactive foam forming formulations, incorporating a high-molecular-weight polyol having a high level of primary hydroxy groups, yields a foam with improved resilience. Such a foam has come to be referred to in the art as a high resilience foam.

Due to the highly reactive nature of the reaction system from which a high resilience foam is prepared, such a system usually has a different exotherm and other reactivity characteristics than conventional polyurethane foam recipies. Consequently, in the absence of special additives or other selective adjustments in the foaming formulation, conventional surfactants are ineffective or unsuitable for use in such a system.

Now it has been found, according to this invention, that high resilience polyurethane foam can be successfully prepared from a reaction mixture which includes, as a surfactant, a silicate-based composition which is prepared by a selective process which comprises:

a. reacting together silicon tetrahalide, an alcohol and water to form a reaction product made up of a volatile portion and a non-volatile portion,
b. removing the volatile portion, and
c. catalytically transesterifying the non-volatile portion with a select polyether alcohol.

In the preparation of the polyurethane foams of the invention, either the so-called "one-shot method" or the "semi-prepolymer technique" may be employed, the one-shot method being preferred. The polyurethane foam is prepared from a reaction mixture comprised of any combination of polyether polyols, as described hereinbelow, organic isocyanates, foaming agents, catalysts, the surfactant composition specified herein, and other reactants capable of forming a flexible polyurethane foam.

The polyether polyol which is utilized according to the method of the invention is one that is characterized by (1) a molecular weight of at least about 4,000, (2) a polyfunctional alcohol nucleus, (3) polyoxyalkylene chain segments attached through one end thereof to the nucleus, and (4) a ratio of primary to secondary hydroxyl end groups ranging from about 1.5:1 to about 6:1. This polyether can be prepared by methods generally well known in the art wherein a polyfunctional alcohol initiator is condensed, in the presence of an alkaline catalyst, first with an alkylene oxide having 3 or more carbon atoms and then with ethylene oxide.

The alcohol initiator which is used to prepare the polyether polyol can be any compound having 2–8 hydroxyl groups. Illustrative are ethylene glycol, propylene glycol, the butylene glycols such as 1,3-butylene glycol, the pentane diols such as 1,5-pentane diol, the hexane diols such as 1,6-hexane diol, glycerol, trimethylolpropane, sorbitol, pentaerythritol, methyl glucoside, sucrose, mixtures thereof and the like. It is preferred, however, to employ an aliphatic polyol having 2–4, and more preferably 3–4, hydroxyl groups, such as ethylene glycol, propylene glycol, glycerol, trimethylolpropane, sorbitol, and the like. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4, carbon atoms and then with ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and preferably about 5,700–7,000, and in which polyether the ratio of primary to secondary hydroxyl groups is from about 1.5:1 to about 6:1, and preferably from about 2:1 to about 5:1.

In accordance with a particularly preferred embodiment of the invention, the polyether polyol which is employed in preparing the polyurethane foam is an oxypropylated, oxyethylated aliphatic triol having a molecular weight of about 5,800–6,600 and a ratio of primary to secondary hydroxyl groups from about 3:1 to about 4.5:1.

In preparing the foams of the invention, any suitable organic polyisocyanate, or a mixture of polyisocyanates, may be employed which is capable of reacting with a polyether polyol to form a urethane. Illustrative are toluene diisocyanate, such as the 80:20 and the 65:35 mixtures of the 2,4- and 2,6-isomers, ethylene diisocyanate, propylene diisocyanate, methylenebis(4-phenylisocyanate), 3,3'bitoluene-4,4'-diisocyanate, hexamethylene diisocyanate, naphthalene-1,5-diisocyanate, the polymeric isocyanates, mixtures thereof and the like. It is preferred however to employ toluene diisocyanate or a mixture thereof with a polymeric isocyanate. Illustrative of the polymeric isocyanates are the polymethylene polyphenylisocyanates such as those described in U.S. Pat. No. 2,683,730. In accordance with a particularly preferred embodiment of the invention a mixture of (1) toluene diisocyanate and (2) polymethylene polyphenylisocyanate is employed in which the weight ratio of (1):(2) is from about 75:25 to about 94:6 and more preferably from about 80:20 to about 92:8.

The amount of polyisocyanate, including mixtures thereof, that is employed should generally be sufficient to provide at least 0.7 NCO group per hydroxyl group in the reaction system, which includes the polyether polyol as well as any additional material and/or foaming agent present in the system. In actual practice such a proportion of polyisocyanate mixture is usually employed as to provide no more than about 1.25, and preferably about 0.9–1.15 NCO groups per each hydroxyl group.

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Usually, however, the halogenated alkanes are employed in an amount of about 2–20 parts per 100 parts by weight of the polyether polyol; and water is employed in an amount of about 1–6 parts per 100 parts by weight of the polyether polyol.

The catalyst employed in preparing the foams of the invention may be any of the catalysts known to be useful for this purpose, including tertiary amines, organo-metallic salts, and mixture of an organo-metallic salt with one or more tertiary amine, the latter being preferred. Typical tertiary amines include for example triethylamine, triethylene diamine, trimethylamine, tetramethylene diamine, tetramethylbutane diamine, N-methylmorpholine, N-ethylmorpholine, dimethylpiperazine, trimethylaminoethylpiperazine, dimethylcyclohexylamine, mixtures of bis(dimethylaminoethylether) and dipropylene glycol such as the 7:3 weight ratio mixture which is available commercially under the trademark Niax A-1, methyldicyclohexylamine, N-cyclohexylmorpholine, dimethylcyclohexylamine, methyldiethanolamine, mixtures of dimethylcyclohexylamine and 2(3-pentyl)-1-dimethylaminocyclohexane such as may be purchased commercially under the trademark Polycat, bis(dimethylaminoethylpropylether), mixtures of triethylene diamine and dipropylene glycol such as the 1:2 and 1:4 weight ratio mixtures which may be purchased commercially under the trademarks Dabco 33LV and Dabco 8020, respectively, bis(dimethylaminopropylether), and mixtures of these catalysts. The preferred tertiary amine catalysts are triethylenediamine, mixtures of triethylene diamine with dipropylene glycol, mixtures of bis(dimethylaminoethylether) and dipropylene glycol, dimethylcyclohexylamine alone or as a mixture thereof with 2-(3-pentyl)-1-dimethylaminocyclohexane. The tertiary amine catalyst is used in a proportion of about 0.1–1.5, and preferably about 0.25–0.75, parts per 100 parts by weight of polyether polyol which is employed in preparing the foam.

Typical organo-metallic salts include for example the salts of tin, titanium, antimony, aluminum, cobalt, zinc, bismuth, lead, and cadmium, the tin salts, i.e., stannic and stannous salts, being preferred. Illustratively, such salts include the octoates, dilaurates, diacetates, dioctoates, oleates, and neodeconates of these metals, the octoates being preferred. The organo-metallic salt catalyst is used in a proportion of about 0–0.5, and preferably about 0.05–0.2, parts per 100 parts by weight of polyether polyol which is employed in the preparation of the foam.

Pursuant to the invention, the polyurethane foam is prepared in the presence of a select silicate-based surfactant composition. This composition is described in detail in pending U.S. application Ser. No. 525,068, which was filed on Nov. 19, 1974, by R. N. Scott, H. F. Lederle, F. J. Milnes and M. A. Raymond. Specifically, the silicate-based surfactant composition is the product of a selective process which comprises the following steps:

a. reacting together silicon tetrahalide, an alcohol and water to form a reaction product made up of a volatile portion and a nonvolatile portion,
b. removing the volatile portion, and
c. catalytically transesterifying the non-volatile portion with a select polyether alcohol.

More in detail, the first step which is used in preparing the surfactant composition involves three essential reactants. The first of these is silicon tetrahalide in which the halogen is preferably chlorine, bromine, iodine or a mixture thereof. Illustrative are silicon tetrachloride, silicon tetrabromide and silicon tetraiodide, the silicon tetrachloride being especially preferred.

The other two reactants are an alcohol and water. The former may be represented by the formula $R_1OH$ wherein $R_1$ is alkyl of 2–20, and preferably 2–10, carbon atoms or aryl of 6–14, and preferably 6–12, carbon atoms. Illustrative such alcohols include:

ethanol
propanol
butanol
pentanol
hexanol
heptanol
octanol
nonanol
decanol
dodecanol
octadecanol
eicosanol
phenol
toluol
xylenol
naphthol
ethyl phenol
benzyl alcohol
diphenyl carbinol It is particularly preferred to employ, as the alcohol reactant, an alkyl alcohol (i.e., $R_1$ = alkyl), the most preferred alkyl alcohols being those in which the alkyl group contains 3–8 carbons such as the propyl, butyl, pentyl, hexyl, heptyl and octyl alcohols.

The proportion of alcohol reactant that is used may be varied over a wide range. For example a proportion of at least 1 mole may be used per mole of silicon tetrahalide, there being no critical upper limit. However, in order to prevent gel formation it is preferred to employ a proportion which is in excess of the stoichiometric amount that is required to react with the silicon tetrahalide and water. Such stoichiometric amount usually varies from about 1 to about 2 moles, per each mole of silicon tetrahalide, depending on the level of water that is used. It is further preferred not to employ too large a stoichiometric excess of alcohol in order to minimize the task of excess alcohol recovery and recycle. Thus pursuant to the preferred embodiments of the invention, a proportion of alcohol is used which ranges from about 2.0 to about 12, and more preferably about 3–10 moles per mole of silicon tetrahalide.

In effecting the reaction of step (a), the level of water is critical. Thus this level must not be less than about 0.2 nor more than about 2.0 moles per each mole of silicon tetrahalide. For optimum results, it is preferred to employ about 0.4–1.7, and still more preferably about 0.6–1.5, moles of water per each mole of silicon tetrahalide.

The reaction of the silicon tetrahalide, water and alcohol may be carried out at any suitable temperature which will bring about inter-reaction of these materials. Usually, however, elevated temperatures are used such as about 40–200°C, preferably about 55–110°C, and more preferably about 60–100°C.

The pressure under which the reaction is effected is not critical. Thus any suitable pressure may be employed. Usually, where the reaction is conducted in an open vessel, atmospheric pressure is preferred for convenience and cost economy. However, lower as well as higher pressures may be employed if desired. For example the use of super-atmospheric pressure may be desirable, when the reaction is effected at highly elevated temperatures, in order to control or prevent boil-up of the reactants.

Any order of mixing the three reactants together may be used provided that the water is not brought in contact with the silicon tetrahalide in the absence of the alcohol. Thus for example the alcohol may be first mixed with the silicon tetrahalide, the water being then added to the mixture; or, alternatively and in accordance with the preferred embodiments of the invention, the water is first mixed with the alcohol and the mixture is then brought together with the silicon tetrahalide. During the time that the reactants are first brought together, cooling is preferably employed in order to prevent reactants boil-up upon initial contact. For example, a temperature below about 25°C, such as about −40°C to about 20°C, is employed. Thereafter, the mixed reactants are heated, preferably under reflux, to the desired temperature within the above-indicated range, in order to promote reaction which is usually completed in about 3–10 hours. A reaction product is then obtained which is made up of a volatile portion and a non-volatile portion. The components of the volatile portion, all of which have a boiling point no greater than about 125°C at 10 m.m. of mercury pressure, are essentially byproduct hydrohalic acid and unreacted or excess alcohol. The non-volatile portion, all the components of which have a boiling point above about 125°C at 10 m.m. of mercury pressure, is a mixture comprised of various silicate-based components. The latter, which usually vary in number, molecular weight and molecular structure depending on the level of water and the level and identity of the alcohol used in effecting the reaction, are believed to include linear and branched silicate-based monomers, dimers, trimers, tetramers, and pentamers; cyclic tri-, tetra-, penta- and higher silicates; and fused-ring silicate-based systems. The non-volatile portion of the reaction product also contains varying proportions of unidentified silicon-containing materials including distillable and non-distillable fractions.

The second step in the preparation of the surfactant composition is the removal of the volatile portion of the product of step (a). Such removal can be achieved by any suitable or conventional method. Illustratively removal of the volatile portion may be effected by conventional stripping such as at a temperature of about 80–120°C and reduced pressure, e.g., about 2–30 millimeters of mercury. Also if desired, further distillation of the product of step (a) may be carried out in order to remove low-molecular-weight silicates from the non-volatile portion.

The third step is the transesterification of the remaining non-volatile portion of the product of step (a). This is achieved by reaction with a select polyether alcohol which is characterized by a molecular weight of about 500–5,000 and is represented by the formula $R_2\text{-}(C_nH_{2n}O)\text{-}H$. In this formula, $R_2$ is alkyl of 1–10 carbon atoms and the moiety $-(C_nH_{2n}O)-$ represents a polyoxyalkylene chain having from about 10 to 100% by weight of oxyethylene units and, correspondingly, from about 90 to 0% of oxypropylene units, oxybutylene units or a mixture of oxypropylene and oxybutylene units. Such a polyether alcohol can be prepared by methods well known in the art wherein, for example, an alkyl alcohol is condensed, in the presence of a basic catalyst such as KOH, with ethylene oxide or with a mixture of ethylene oxide and higher alkylene oxides as specified above using random or step-wise addition.

The preferred polyethers for use in the transesterification reaction are those having a molecular weight of about 1,000–4,000. Particularly preferred polyethers are those represented by the formula above wherein $R_2$ contains 1–6 carbons, e.g., methyl, ethyl, propyl, butyl, heptyl or hexyl, and the moiety $-(C_nH_{2n}O)-$ represents a polyoxyethylene chain or a polyoxyethylene-oxypropylene chain having a weight ratio of oxyethylene to oxypropylene units ranging from about 1:2 to about 2:1.

In carrying out the transesterification reaction, the polyether alcohol represented by the above formula is employed in a molar proportion which is sufficient to bring about replacement of part, but not all, of the alkoxy or aryloxy moieties, i.e., $R_1O—$, in the silicate-based intermediate mixture prepared in step (a) with polyether alkoxy moieties, i.e., $R_2\text{-}(C_nH_{2n}O)\text{-}$. This proportion ranges from about 0.006 to about 1.1 moles of polyether alcohol per each mole of silicon tetrahalide used in step (a), provided that it does not exceed about 55% of the molar proportion of alcohol $R_1OH$ consumed in the reaction of step (a). A preferred molar proportion of polyether alcohol to be used in the transesterification reaction ranges from about 0.06 to about 0.8 mole per each mole of silicon tetrahalide used in step (a), such a proportion further being no less than about 3% nor more than about 49% of the molar proportion of alcohol consumed in step (a).

The reaction is effected in the presence of a transesterification catalyst. Any such catalyst may be employed which is effective in promoting the reaction. This includes a wide variety of basic and acidic catalysts. The basic catalysts are exemplified by the alkylamines, the alkali metals (e.g., Na, K, Li, Cs, Ru), the alkaline earth metals (e.g., Ca, Mg, Ba, Sr), and the hydrides, alkoxides and hydroxides of the alkali and alkaline earth metals. The acidic catalysts include the Lewis acids as described for example in Jack Hine, *Physical Organic Chemistry*, 1962, McGraw-Hill Book Co., N.Y., the entire disclosure of which is incorporated herein by reference. Exemplificative such acids include boron trifluoride and its etherate derivatives, ferric chloride, ferrous chloride, stannic chloride, titanium tetrachloride, antimony pentachloride, aluminum chloride, hydrogen fluoride, aluminum bromide, triethyl aluminum, zinc chloride, zinc bromide, tetrabutyl titanate, and so forth. The preferred transesterification catalysts are the Lewis acids, the alkali metals and the alkali metal hydrides, the alkali metals and their hydrides (e.g., sodium and potassium hydride) being especially preferred.

The transesterification is effected at elevated temperatures. For example, a temperature ranging from about 65° to about 320°C, preferably about 80°–260°C, and more preferably about 120°–220°C is used. The reaction pressure is not critical, but atmospheric pressure is preferred for economy and simplicity of operation. It is also preferred to effect the reaction in the substantial absence of moisture. To this end for example, a blanket or atmosphere of nitrogen or other inert gas may be used. Complete reaction time usually varies from about 1 to about 10 hours depending on the reaction temperature that is used.

By virtue of the partial replacement of alkoxy or aryloxy moieties with polyether alkoxy moieties which is effected in the transesterification reaction, some of the alcohol consumed in step (a) will be liberated during transesterification. Thus the product of the transesterification reaction will be comprised of a proportion of alcohol $R_1OH$, which proportion varies depending on the molar proportion of polyether alcohol used in transesterification, and a mixture comprised of several silicate-based species which make up the essential components of the surfactant composition. The entire transesterification product, including liberated alcohol, may be used as is in the production of polyurethane foam according to the invention. However, it is preferred to remove the liberated alcohol before utilizing the transesterification product. Such removal may be achieved by any suitable or conventional method such as distillation.

The surfactant composition which is recovered after removal of liberated alcohol is a viscous liquid mixture comprised of several structurally unidentified, high boiling silicate-based species which are believed to have an average molecular weight within the range of about 700–7,000. The silicate-based surfactant composition is further characterized by an over-all silicon content ranging from about 5 to about 23% by weight, and, correspondingly, an over-all carbon content ranging from about 72 to about 23% and an over-all hydrogen content from about 12 to about 6%, the balance being mainly oxygen. The preferred ranges of these components are about 6–10% of silicon and correspondingly about 65–40% of carbon and about 10–7% of hydrogen.

The most preferred silicate-based surfactant composition for use according to the invention is one which is prepared by a process comprising the following steps:

A. Preparation of a mixture of silicon tetrachloride and, per every mole of the silicon tetrachloride, about 0.7–1.4 moles of water and about 3–8 moles of an alcohol selected from isopropyl alcohol and secondary butyl alcohol. This step is carried out at a reduced temperature such as from about −30°C to about 20°C and it is preferably effected by gradually adding a mixture of water and alcohol to the silicon tetrachloride.

B. Reaction of the mixture prepared in step A. Such reaction is effected at a temperature of about 60°–100°C and under reflux conditions, the product of the reaction being made up of hydrochloric acid, excess unreacted alcohol and a non-volatile mixture comprised of silicate-based materials.

C. Recovery of the non-volatile mixture obtained in step B. Such recovery may be achieved by stripping off the hydrochloric acid and excess unreacted alcohol preferably using a temperature of about 80°–120° and a pressure of 2–30 millimeters of mercury.

D. Catalytic transesterification of the non-volatile mixture obtained in step C with a polyether alcohol having a molecular weight of about 1,200–2,500 and represented by the formula $C_4H_9\text{-}(C_nH_{2n}O)\text{-}H$ in which the moiety $\text{-}(C_nH_{2n}O)\text{-}$ represents a polyoxyethylene-oxypropylene chain having a weight ratio of oxyethylene to oxypropylene units ranging from about 4:6 to about 6:4. In carrying out this step, a proportion of polyether alcohol is used which ranges from about 0.1 to about 0.7 mole per each moles of silicon tetrachloride used in step A. Furthermore, the transesterification reaction is effected at a temperature of about 140°–220°C and in the substantial absence of moisture such as by using a blanket or atmosphere of nitrogen gas. The transesterification catalyst is a Lewis acid, an alkali metal or an alkali metal hydride, the alkali metals and their hydrides being especially preferred such as sodium, sodium hydride, potassium and potassium hydride. Along with the silicate-based surfactant composition of the invention, the transesterification product will comprise some liberated alcohol.

E. Recovery of the silicate-based surfactant composition obtained in step D. Such recovery is achieved by removing the liberated alcohol such as by distilling it off.

In preparing the foams of the invention, the above-described surfactant composition may be employed in any suitable proportion which is effective in stabilizing the foam and providing other desirable foam properties without otherwise interfering with the polyurethane forming reaction or materially altering the basic properties of the resulting foam. Illustratively, such a proportion ranges from about 0.01 to about 5, and preferably about 0.25–2.5, parts per every 100 parts by weight of polyol which is used in making the foam.

If desired in the preparation of the foams of the invention, various additives may be included in the foam forming reaction mixture, which additives serve to provide different properties. For example, cross-linking agents may be added to speed the curing of the foam; dyes may be added for color; flame retardants may be used to achieve varying degrees of resistance to burning; and so forth.

In the practice of this invention, a polyurethane foam-forming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bringing about the formation of an uncured cellular gel material which usually cures fairly rapidly at room temperature. Once cured, the foam will be ready for use in various applications, such as seating, bedding, cushioning, etc.

The high resilience polyurethane foams of the invention are relatively stable and do not succumb to substantial shrinkage or collapse before they become fully cured. In addition, they are characterized by a fine and uniform cell structure and a combination of desirable physical properties which are typical of high resilience polyurethane foam. As such the foams of the invention are of utility in numerous cushioning applications such as the production of padding, seat cushions and automotive bucket seats.

The following examples are provided to illustrate the invention. In these examples, all parts and percentages are by weight unless otherwise specified.

EXAMPLE 1

A 5 liter 3-neck flask fitted with a magnetic stirrer, a thermometer and a gas outlet was charged with 849.5 grams (5 moles) of silicon tetrachloride and cooled to 0°C with an ice-water bath. A solution of 81 mls. (4.5 moles) of $H_2O$ in 2 kgs. (33.3 moles) of isopropanol was then added with stirring over a period of 2.5 hours. Rapid HCl evolution during the early stages of the aqueous isopropanol addition helped to cool the reaction mixture making it relatively easy to maintain a temperature between 4° and 10°C. After about half the isopropanol was added, HCl evolution slowed considerably resulting in an apparent exotherm, and frequent stirring of the ice bath was required to maintain the temperature of the reaction mixture below 20°C. During the latter stages of the addition, the reaction mixture became cloudy with ultimate formation of two phases. After addition of aqueous isopropanol was complete, the mixture was heated to 82°C under reflux for 3 hours, at which point it was homogeneous.

The product thus formed was then stripped of volatiles up to a bottoms temperature of 100°C and 20 m.m. of mercury pressure. The over-head fractions, mainly excess unreacted isopropanol and by-product hydrochloric acid, were discarded, leaving a viscous liquid residual intermediate weighing 662 grams and having a viscosity of 60 c.s. at 100°F.

The amount of 215 grams of the intermediate prepared above was used to prepare a silicate-based surfactant composition following this procedure. A 1-liter, 3-neck flask equipped with a mechanical stirrer, a nitrogen inlet, a dry ice-cooled Dewar condenser and a Dean-Stark trap was charged with 350 g of a butanol initiated, oxyethylated, oxypropylated polyether having a molecular weight of 1,800 and a 1:1 weight ratio of ethylene oxide:propylene oxide. To this there were added 215 grams of the intermediate obtained above and 0.3 gram of tetrabutyl titanate catalyst. The flask was then immersed in a 130°C oil bath. With a nitrogen sweep of 550 cc/min. and rapid stirring (375 rpm), the oil bath was rapidly heated (10–15 min.) to 195°C and maintained at this temperature for 4 hours. The product was cooled under nitrogen and the volatile distillate (15 g. isopropanol) was discarded leaving a final product of 524 grams which was a homogeneous liquid surfactant composition having a kinematic viscosity of 407 cs. at 100°F. The components of this composition could not be identified by available methods, e.g., gas chromatography, mass spectrometry, nuclear magnetic resonance, and infrared analysis. However, its over-all content of silicon, carbon, hydrogen and oxygen was determined by gravimetric analysis to be as follows:
silicon:7.25%
carbon:50.24%
hydrogen:8.8%
oxygen:33.7%

A flexible high resilience polyurethane foam was prepared from a reaction mixture comprised of 0.3 parts of the surfactant composition prepared above and the following ingredients.

| Ingredients | Parts by Weight |
|---|---|
| Polyether polyol[1] | 98.0 |
| Oxypropylated triethanolamine curing agent | 2.0 |
| Water | 3.0 |
| Catalyst System | |
| a) Triethylene diamine[2] | 0.15 |
| b) Bis (2-dimethylaminoethyl) ether[3] | 0.07 |
| c) Stannous octoate | 0.02 |
| Polyisocyanate mixture[4] (105 index) | 36.6 |

[1]This is a polyether triol having 70% primary hydroxyl groups and an approximate molecular weight of 5,900. It was prepared by sequentially oxyalkylating glycerine with 90 moles of propylene oxide and then with 15 moles of ethylene oxide.
[2]This is commercially obtained product, sold under the trademark "Dabco 33LV" and consisting mainly of ⅓ triethylene diamine and ⅔ dipropylene glycol.
[3]This is a commercially obtained product sold under the trademark "NIAX A-1" and consisting mainly of 70% bis (2-dimethylaminoethyl) ether and 30% dipropylene glycol.
[4]This is a mixture of 4 parts toluene diisocyanate (80/20 mixture of 2,4-/2,6-isomers) to 1 part polymethylene polyphenylene isocyanate. The latter is a product of the Upjohn Company, purchased under the trademark "PAPI". It is approximately a trifunctional isocyanate having an NCO content of 31.5% and a specific gravity of 1.2.

The above mixture was hand mixed at room temperature and immediately poured into a cake box. Using a stop-watch, the "cream time", "rise time" and "gel time" were measured, all being from the moment the mixture is placed in the mold. The cream time was 8 seconds and this is the time elapsed, up to the point when foaming commences, during which time the mixture is transformed from a liquid to a cream or emulsion. The rise time was 120 seconds and this is the time elapsed for completion of the foaming reaction or expansion of the foam. This is usually evidenced by appearance of gas bubbles on the surface of the foam. The gel time was 130 seconds and this is the time elapsed for the resulting foam to become a self-supporting body as evidenced by the foam exhibiting resistance to being penetrated by a dull instrument.

The product produced was a good, open-celled, stable foam.

EXAMPLE 2

The exact procedure of Example 1 was followed with one exception. This is that the intermediate product obtained by the reaction of carbon tetrachloride with water and isopropanol was subjected to further purification by distillation. To this end, it was placed in a 1-liter, 3-neck flask equipped with a magnetic stirrer, a 5 inch vacuum jacketed Virgreux column, a vacuum take-off head, a fraction cutter, and an immersed pot thermometer. Distillation was carried out up to a bottoms temperature of 210°C and 15 m.m. of mercury pressure. The bottoms fraction thus obtained weighed 538 grams which represented 75% yield based on $SiCl_4$ charged. This fraction which had a kinematic viscosity at 100°F of 139.0 cs was then transesterified exactly as described in Example 1. After removal of liberated isopropanol, a liquid surfactant composition was obtained which had a viscosity of about 390 cs at 100°F. The overall silicon, carbon, hydrogen and oxygen content in this composition was determined by gravimetric analysis to be as follows: 7.94% silicon, 50.56% carbon, 9.3% hydrogen and 32.47% oxygen.

The product of this example was found to be effective as a stabilizer, when used exactly as described in Example 1, in the preparation of polyurethane foam.

EXAMPLE 3

The identical procedure of Example 2 was followed with the following exceptions. In carrying out the transesterification reaction, 62 grams of the butanol-initiated polyether and 38 grams of the bottoms fraction, of the product of the reaction of $SiCl_4$ with water and isopropyl alcohol, were used. In addition, the catalyst used to promote transesterification was metallic sodium (0.05 gram) instead of the tetrabutyl titanate. Finally the transesterification reaction was effected at 165°C.

After transesterification and removal of evolved isopropanol, a homogeneous, viscous liquid product was obtained with weighed 96 grams. This product was found to be equally effective as a stabilizer when used in preparing polyurethane foam as described in Example 1.

EXAMPLE 4

The identical procedure of Example 3 was followed except that 0.05 gram of sodium hydride was used as the transesterification catalyst instead of the metallic sodium. Again the product of transesterification, after removal of liberated isopropanol, was found to be an effective stabilizer in the production of a high resilience polyurethane foam based on the formulation used in Example 1.

EXAMPLE 5

The identical procedure of Example 3 was followed with one exception. This is that in carrying out the first reaction, instead of 33.3 moles, 20 moles of isopropanol were used. The final product, after being freed of liberated isopropanol, was found to be an effective stabilizer in preparing high resilience polyurethane foam per Example 1.

EXAMPLE 6

The procedure of Example 5 was followed except that instead of the 20 moles of isopropanol used in the first reaction, 33 moles of butanol-2 were employed. The final product, after removal of liberated butanol, was a viscous liquid. Its over-all content of silicon, carbon, hydrogen and oxygen was determined by gravimetric analysis to be as follows:

silicon : 7.58%
carbon : 54.14%
hydrogen: 9.49%
oxygen : 28.79%

The product of this example was found to be an effective stabilizer in the production of high resilience polyurethane foam based on the formulation of Example 1.

What is claimed is:

1. A flexible polyurethane foam prepared from a reaction mixture which is comprised of:
   a. an organic polyisocyanate,
   b. a polyether polyol having in its structure the nucleus of an aliphatic alcohol having 2-8 reactive hydrogens and polyoxyalkylene chain segments attached through one end thereof to said nucleus at the site of the reactive hydrogens, said polyether polyol being further characterized by (1) a molecular weight of at least about 4,000 and (2) a ratio of primary to secondary hydroxyl end groups ranging from about 1.5:1 to about 6:1,
   c. a foaming agent,
   d. a reaction catalyst, and
   e. a silicate-based surfactant composition which is prepared by a process that comprises
      1. reacting together, at a temperature of about 40°–200°C, (a) a silicon tetrahalide selected from the group consisting of silicon tetrachloride, silicon tetrabromide, and silicon tetraiodide, and, per every mole of said silicon tetrahalide (b) about 0.2–2.0 moles of water and (c) at least about one mole of an alcohol represented by the formula $R_1OH$ wherein $R_1$ is alkyl of 2–20 carbon atoms or aromatic hydrocarbon of 6–14 carbon atoms, the reaction yielding a product made up of a volatile portion, which has a boiling point no greater than about 125°C at 10 mm of mercury pressure, and a non-volatile portion, and
      2. removing said volatile portion, and
      3. at a temperature of about 65°–320°C in the substantial absence of moisture and in the presence of a transesterification catalyst, reacting the non-volatile portion of the product of step (1) with a polyether alcohol having a molecular weight of about 500–5,000 and represented by the formula $R_2\!-\!(C_nH_{2n}O)\!-\!H$ wherein $R_2$ is alkyl of 1–10 carbon atoms and the moiety $-(C_nH_{2n}O)-$ represents a polyoxyalkylene chain consisting of from about 10 to 100 percent by weight of oxyethylene units, and, correspondingly, about 90–0 percent of oxypropylene units, oxybutylene units or a mixture of oxypropylene and oxybutylene units, said polyether alcohol being employed in a molar proportion ranging from about 0.006 to about 1.1 moles per every mole of said silicon tetrahalide which is used in step (1), with the proviso that the molar proportion of said polyether alcohol is no more than about 55% of the molar proportion of alcohol reacted in thre reaction of step (1).

2. The polyurethane foam of claim 1 wherein said polyether polyol is an oxypropylated, oxyethylated aliphatic triol having a molecular weight of about 5,800–6,600 and a ratio of primary to secondary hydroxyl groups ranging from about 2.2:1 to about 4.5:1.

3. The polyurethane foam of claim 2 wherein said organic polyisocyanate is a mixture of (1) toluene diisocyanate and (2) polymethylene polyphenylisocyanate in a weight ratio, (1):(2), ranging from about 75:25 to about 94:6.

4. The polyurethane foam of claim 1 wherein the process of preparing said surfactant composition includes the added step of removing alcohol of said formula $R_1OH$ which is liberated during the reaction of step (3).

5. The polyurethane foam of claim 4 wherein said $R_1$ is alkyl of 3–8 carbon atoms, said $R_2$ contains 1–6 carbon atoms and said transesterification catalyst is selected from the group consisting of a Lewis acid, an alkali metal and an alkali metal hydride.

6. The polyurethane foam of claim 5 wherein said polyether poly-1 is an oxypropylated, oxyethylated triol having a molecular weight of about 5,700–7,000.

7. The polyurethane foam of claim 6 wherein said silicon tetrahalide is silicon tetrachloride and said polyether alcohol has a molecular weight of about 1,500–4,000 and in which said ($C_nH_{2n}O$) moiety represents a polyoxyethylene chain or a polyoxyethylene-oxypropylene chain having a weight ratio of oxyethylene to oxypropylene units ranging from about 2:1 to about 1:2.

8. The polyurethane foam of claim 7 wherein the reaction of step (1) is carried out at about 55°–110°C, under reflux, and using, per every mole of said silicon tetrachloride, about 2–12 moles of said alcohol and about 0.4–1.7 moles of said water.

9. The polyurethane foam of claim 8 wherein the reaction of step (3) is carried out at about 80°–260°C, and using about 0.06–0.8 moles of said polyether alcohol per every mole of said silicon tetrachloride which is used in step (1).

10. The polyurethane foam of claim 9 wherein said polyether triol has a ratio, of primary to secondary hydroxy groups, ranging from about 2:1 to about 5:1.

11. The polyurethane foam of claim 10 wherein organic polyisocyanate is toluene diisocyanate or a mixture thereof with polymethylene polyphenylisocyanate.

12. The polyurethane foam of claim 11 wherein said reaction catalyst is selected from the group consisting of a tertiary amine, an organo-tin salt and mixture thereof.

13. The polyurethane foam of claim 12 wherein said organic polyisocyanate is a mixture of (1) toluene diisocyanate and (2) polymethylene polyphenylisocyanate in a weight ratio, (1):(2), ranging from about 75:25 to about 94:6.

14. A polyurethane foam as claimed in claim 13 wherein said silicate-based surfactant composition is the product of the process which comprises the following steps:

1. at a temperature from about −30°C to about 20°C, mixing together silicon tetrachloride and, per every mole of said silicon tetrachloride, about 0.7–1.4 moles of water and about 3–8 moles of isopropyl alcohol, 2. allowing said mixture to react at a temperature of about 60°–100°C and under reflux conditions, thereby forming a reaction product made up of hydrochloric acid, unreacted isopropyl alcohol and a non-volatile mixture comprised of silicate-based materials, 3. stripping off said hydrochloric acid and unreacted isopropyl alcohol, 4. reacting said non-volatile mixture with a polyether alcohol having a molecular weight of about 1,200–1,500 and represented by the formula $C_4H_9$ ($C_nH_{2n}O$) H wherein the moiety ($C_nH_{2n}O$) represents a polyoxyethylene-oxypropylene chain having a weight ratio, of oxyethylene to oxypropylene units, ranging from about 6:4 to about 4:6, the reaction being carried out.

a. using about 0.1–0.7 mole of said polyether alcohol per each mole of said silicon tetrachloride used in step (a),
   b. at a temperature of about 140°–220°C,
   c. in the substantial absence of moisture, and
   d. in the presence of a transesterification catalyst selected from the group consisting of a Lewis acid, an alkali metal and an alkali metal hydride, thereby forming a product comprised of a silicate-based surfactant composition and liberated isopropyl alcohol, and 5. removing said liberated isopropyl alcohol and recovering said silicate-based surfactant composition.

15. The polyurethane foam of claim 14 wherein said foaming agent is water.

16. The polyurethane foam of claim 15 wherein said polyether triol is oxypropylated, oxyethylated glycerin.

* * * * *